United States Patent [19]
Wu et al.

[11] Patent Number: 5,661,533
[45] Date of Patent: Aug. 26, 1997

[54] ULTRA FAST RESPONSE, MULTISTABLE REFLECTIVE CHOLESTERIC LIQUID CRYSTAL DISPLAYS

[75] Inventors: Bao-Gang Wu, Richardson; Hongxi Zhou, Dallas; Yao-Dong Ma, Richardson, all of Tex.

[73] Assignee: Advanced Display Systems, Inc., Amarillo, Tex.

[21] Appl. No.: 445,181

[22] Filed: May 19, 1995

[51] Int. Cl.⁶ .............................. G02F 1/1333; G02F 1/13
[52] U.S. Cl. .............................. 349/169; 349/176; 349/88
[58] Field of Search ........................ 359/90, 91, 102, 359/101, 75; 349/88, 115, 169, 176

[56] References Cited

U.S. PATENT DOCUMENTS

| | | | |
|---|---|---|---|
| 3,642,348 | 2/1972 | Wysocki et al. | 350/160 |
| 3,650,603 | 3/1972 | Heilmeier et al. | 350/160 |
| 3,652,148 | 3/1972 | Wysocki et al. | 350/150 |
| 3,806,230 | 4/1974 | Haas | 350/160 LC |
| 3,821,720 | 6/1974 | Greubel et al. | 340/173 LS |
| 3,891,307 | 6/1975 | Tsukamoto et al. | 350/160 LC |
| 4,097,127 | 6/1978 | Haas et al. | 350/332 |
| 4,234,437 | 11/1980 | Friberg et al. | 252/62.51 |
| 4,239,347 | 12/1980 | Braatz et al. | 350/336 |
| 4,357,374 | 11/1982 | Ogawa | 428/1 |
| 4,402,999 | 9/1983 | Tatsumichi et al. | 427/126.3 |
| 4,505,548 | 3/1985 | Berreman et al. | 350/346 |
| 5,170,204 | 12/1992 | Mukai et al. | 354/409 |
| 5,251,048 | 10/1993 | Doane et al. | 359/51 |
| 5,384,067 | 1/1995 | Doane et al. | 252/299.01 |
| 5,422,033 | 6/1995 | Mochizuki et al. | 252/299.01 |
| 5,453,863 | 9/1995 | West et al. | 359/91 |
| 5,495,355 | 2/1996 | Konuma | 359/102 |

FOREIGN PATENT DOCUMENTS

| | | |
|---|---|---|
| 0 123 981 | 11/1994 | European Pat. Off. . |
| 52-113386 | 9/1977 | Japan . |
| WO94/10260 | 5/1994 | WIPO . |

OTHER PUBLICATIONS

D.K. Yang et al., "Cholesteric reflective display: drive scheme and contrast". *Applied Physics Letters*, 11 Apr. 1994, vol. 64, No. 15, pp. 1905–1907

B–G. Wu et al., "Zero Field, Multistable Cholesteric Liquid Crystal Displays," Oct. 1994, 14th International Display Research Conference (IDRC), Conference Record, pp. 476–479.

D.-K. Yang et al., "Cholesteric Liquid–Crystal/Polymer––Gel Dispersions: Reflective Display Applications," SID 92 Digest, Jun. 1992, pp. 759–761.

J.W. Doane et al., "Front–Lit Flat Panel Display from Polymer Stabilized cholesteric Textures," Proceedings of Japan Display '92, pp. 73–76.

*Primary Examiner*—William L. Sikes
*Assistant Examiner*—Charles Miller
*Attorney, Agent, or Firm*—Hitt Chwang & Gaines, P.C.

[57] ABSTRACT

Surfactant-containing multistable cholesteric liquid crystal displays exhibit ultra fast response times with both video speed and gray scale capability.

40 Claims, 4 Drawing Sheets

ULTRA FAST RESPONSE, MULTISTABLE REFLECTIVE CHOLESTERIC LIQUID CRYSTAL DISPLAYS

BACKGROUND

This invention involves multistable cholesteric liquid crystal displays exhibiting ultra fast response times with both video speed and gray scale capability.

The rapid developments in high-density data acquisition and storage continue to create demands for higher speed, higher information content display devices. Additionally, technological developments, particularly those involving video displays, continue towards a decreased reliance on relatively bulky and high power consumption cathode ray tube (CRT) devices. Instead, emphasis is being placed on the construction of smaller, lighter and overall more compact systems such as those being developed by the flat panel display (FPD) industry. Certainly, the most active component of the FPD industry is that area based on the use of liquid crystals to provide the necessary light modulation and storage.

Although flat panel liquid crystal displays have already achieved widespread use, there are still major drawbacks associated with these displays. For example, most high information content displays require use of polarizers and other light attenuating components thus creating relatively high power consumption back lighting requirements. This is a severe disadvantage in many applications, such as in operation of portable notebook type displays. There are additional disadvantages associated with the two most commonly used liquid crystal FPDs which employ either active matrix thin film transistors (AMTFT) or supertwist nematic (STN) technologies. For example, AMTFT devices use transistors for each pixel to provide memory effects. In addition, they also require expensive, ultra high resistance liquid crystal materials to minimize RC losses which in turn enables longer holding times. AMTFT displays are both difficult and costly to produce and, at present, are limited to relatively small size displays. Additionally, they are not zero field image storage systems as they require a constant power input for image refreshing. The STN displays do not possess inherent pixel gray scale capability as a result of the extreme steepness of the optical voltage response curve of the liquid crystals employed. It should be noted that STN displays have an inherent slow response rate. Their response rates are too slow for video applications. Finally, it should also be mentioned that both AMTFT and STN displays have very restricted viewing angles.

An important advance in FPD technology would be development of a display which eliminates the need for light modulating components (e.g., polarizers, retarders, analyzers, color filters, etc.) and thus the need for high power consumption back lighting. At the same time, it is understood that this elimination should not compromise other display properties. An attractive potential candidate in this regard would be use of cholesteric liquid crystals to replace the nematic and super-twist nematic liquid crystal mixes currently employed. It has long been known that cholesteric LCDs can provide light modulation without recourse to polarizers and back lighting requirements. This light modulation capability arises from the ability of cholesteric liquid crystals to exist in either a reflective or in a light scattering structure. In the reflective state, the liquid crystal molecules are arranged in domains with the long axes of the molecules roughly parallel to each other in each hypothetical layer. However, steric and asymmetry properties of the molecules result in a progressive slight displacement of the long axis of the molecules with respect to adjacent layer. The combined net effect of these small displacements is creation of a helical molecular structure in each domain. The helical axis is the director of the domain. When the domain directors are roughly parallel to each other and perpendicular to the cell surface, electromagnetic radiation perpendicularly incident on the LCD cell surface is efficiently transmitted except for a relatively narrow wavelength band which is reflected. The wavelength of the reflected radiation is given by the relationship lambda $(\lambda)$=n P where n is the average refractive index $(n=(n_e+n_o)/2)$ [$n_e$ is the extraordinary refractive index; $n_o$ is the ordinary refractive index] and P is the pitch (i.e., twice the repetition length of the helical structure) of the liquid crystals. The reflected wavelength maximum is selectable by appropriate adjustment of the n and/or P values of the liquid crystal mixes employed. This is referred to as the Reflective State. If the selected wavelength is outside the visible region of the electromagnetic spectrum (e.g., in the infrared), the reflective cholesteric liquid crystal texture would be described as a transmissive state.

In contrast with the visible reflective or transmissive state, the scattering structure represents a 2-D random orientation of the helical axis of the domains. This randomization provides an efficient scattering of incident electromagnetic radiation. If the thickness of the liquid crystal medium is sufficiently large, and the pitch, birefringence of the liquid crystals, and size of domain are satisfactory, the majority of incident visible radiation is scattered and the display appears to be milky white. If, however, in contrast, the thickness of liquid crystal medium is relatively thin (e.g., less than 5 microns), only a small percentage of the incident radiation will be back scattered with the remainder being transmitted. If the liquid crystal display has been assembled using a back plate liner which can strongly absorb visible radiation, the display will appear to be black when the liquid crystals are in a light scattering texture. This is referred to as the Dark State.

Intermediate orientation of domains, in which the domain directors are neither perpendicular to the surface nor parallel to the surface, but at an orientation in between. There are infinite stable states between the Reflective State and Dark State. These are referred to as intermediate states which are capable of displaying infinite "gray shales."

Switching from any state to another is achieved by application of an appropriate electrical field impulse thus providing the desired light modulation.

Although cholesteric LCDs offer potential advantages in terms of avoiding the need for light modulating components, there has been no commercial development involving these displays in direct view mode applications. Perhaps the most important reason for this lack of commercial development is the relatively poor contrast ratio typically available when these displays are operated in a direct view mode using the difference in transmitted and scattered light. This arises from the fact that the diffuse light scattering texture permits transmission of a significant portion of the incident visible light at the cell gap typically employed in LCDs. This results in a reduction of the contrast ratio. An additional disadvantage of cholesteric LCDs is that they require significantly higher driving voltages than many other LCDs.

It has been found that a particularly important application of the present invention is achieved using cholesteric liquid crystal displays which exhibit multistable zero field stability, specifically ones in which this zero field stability is achieved without recourse to polymer gel additives. In these displays, the cholesteric LC domains helical axis exhibit a continuous orientation distribution of states ranging from reflective to dominantly light scattering in which each intermediate state is indefinitely stable under zero field conditions. Establishment of this zero field multistability is achieved by minimizing the interactions (i.e., boundary effects) existent between the solid substrates and the liquid crystal domains. Typically these solid surface-LC interactions result in establishment of a preferred liquid crystal domain texture in the absence of any applied fields. For example, these interactions result in slow zero field relaxation of light scattering domains to reflective domain structures. These boundary driven relaxation phenomena have frustrated efforts by earlier inventors to create permanently stable zero field bistable displays (e.g., U.S. Pat. Nos. 3,707,331; 3,821,780 and 3,806,230). However, it has been found that zero field multistable cholesteric displays can be achieved by elimination of any alignment layer or directional rubbing of the solid substrates used to encase the LC mix. The elimination of the directive surface interaction reduces the system energy difference between the most reflective domain orientation and the various other domain orientations. In this manner, zero field multistability is achieved as the most reflective liquid crystal structure is of essentially the same energy as the darkest light scattering array and this energy equalization includes all intermediate domain structures spanning the most reflective and darkest light scattering extremes. The zero field domain structures of a particular texture can be varied using a very short duration high voltage pulse or a lower voltage pulse of longer duration thus providing a continuous zero field gray scale capability. The progressive change in domain orientations can be realized starting with either the reflective structure extending all the way to the darkest light scattering state, or conversely, starting with the darkest light scattering state and extending all the way to the most reflecting structure. Each intermediate state so established between the reflective and light scattering extremes is indefinitely stable under zero field conditions.

Although the present invention focuses on applications involving multistable zero field cholesteric liquid crystal displays, those schooled in the art of LCD technology will recognize that the invention described herein is applicable to numerous other liquid crystal display types.

SUMMARY

Figure 1:
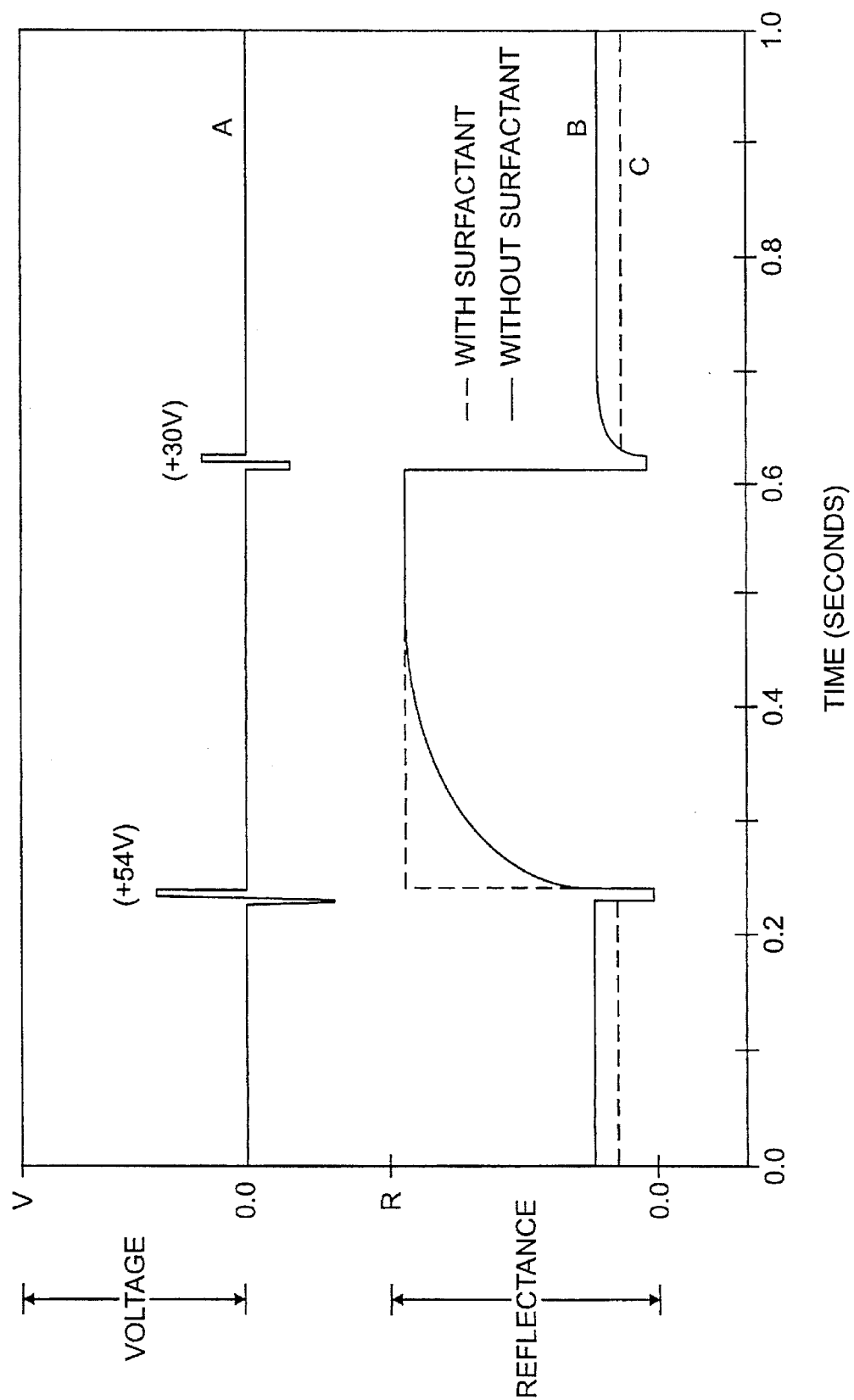
FIG. 1 shows comparative optical response curves for cholesteric liquid crystals with and without surfactant additives, under identical voltage pulses. Upper graph [A] shows time (abscissa) and magnitude (ordinate, O to V) of the voltage application. Lower lines show the relative display reflectance (ordinate, O to R) for liquids without added surfactant [curve B—solid line] and with added surfactant [curve C—dashed line] using the same time scale as the voltage pulse application.

Broadly, the present invention pertains, in one aspect, to a liquid crystal cell structure containing a first solid substrate having a first inner surface coated with a first conductive layer; a second solid substrate having a second inner surface coated with a second conductive layer; and a substantially indefinite zero field multistable cholesteric liquid crystal mix located in a space between the first inner surface of the first solid substrate and the second inner surface of the second solid substrate, the liquid crystal mix comprising a surface active agent, preferably a non-ionic one; optionally water; a plurality of liquid crystals; and at least one twist agent forming multiple cholesteric domains; wherein each of the multiple cholesteric domains is a visible or near-visible reflective unit; wherein an orientation of each of the multiple cholesteric domains can be changed by application of a voltage pulse; wherein the orientation of each of the multiple cholesteric domains is substantially free of interactions among the multiple cholesteric domains and also free of interaction among the multiple cholesteric domains and the first and second solid substrates to yield zero field multistability; and wherein the relaxation time from a nematic phase to a reflective cholesteric texture is below about 150 milliseconds. The relaxation time can reach below about 150 microseconds and even down to about 10 microseconds or lower. The liquid crystal mix can be free of a polymer gel additive, such as polyvinyl alcohol, polyacrylate prepolymer, thermoplastic polymers, etc. If need be, the first, second, or both, conductive layers can be coated with one or more similar or different amorphous boundary layers, such as polyimide and silane.

The present invention provides the first example of a cholesteric liquid crystal display which exhibits ultra fast switching times without compromise of key display properties, including operation in a direct view mode. In fact, response times achieved in this invention are sufficiently fast to permit, for the first time, operation of direct view cholesteric displays at video frame rates.

The high contrast ratio display of this invention is achieved using relatively short cholesteric liquid pitches which exhibit maximum reflectance in the visible region of the electromagnetic spectrum, in accord with the lambda ($\lambda$)=n P equation. Additionally, small cell gaps (i.e., d<5 microns) are employed so that only a relatively small percentage of the incident radiation is scattered when the cholesteric liquid crystals are in the light scattering texture. A back plate liner is employed to absorb all of the transmitted visible radiation, thus providing a black color to the display when operated in the scattering mode. The contrast ratio of the liquid crystal cells of the present invention represent optical differences between the reflective and light scattering states.

The present invention can retend the inherent high contrast ratio obtainable with the reflective mode while simultaneously achieving ultra short optical switching times. This advance has been achieved via inclusion of new additives, such as a non-ionic surfactant, to the cholesteric liquid crystal mix. These additives are not polymer gel additives. The surface active agents added to the cholesteric liquid crystal mix in the present invention, in effect, permit much faster relaxation of the domain structures following application of a voltage pulse. It is believed that the function of these additives is to isolate the domains from each other while simultaneously reducing the frictional (i.e., drag) forces between the domains and between the domains and boundary surface. Additionally, the chemical additives minimize the natural self-alignment domains experience among each other and produce a more uniform distribution of domain sizes. The net effect of the surfactant additives is to allow continuation of a structure in which the orientation of each microscopic sized liquid crystal domain is stable under zero field conditions, but at the same time, is now much freer to respond to a perturbation such as that imposed by a voltage pulse. In effect, the surfactant chemical additive functions as a lubricant between the liquid crystal domains and between domains and boundary surfaces.

Thus, in the present invention, the increase of the cholesteric liquid crystal domains response times has been achieved via addition of a surfactant to the liquid crystal mix. As used herein, a "surfactant" means a "surface active agent" that reduces surface tension when dissolved in water or water solutions, or which reduces interfacial tension between two liquids, or between a liquid and a solid. As is known in the art, there are three categories of surface active agents: detergents, wetting agents, and emulsifiers. Common detergent are sodium soaps of fatty acids. Detergents are classed as anionic, cationic, and non-ionic, including zwitter ions. Most widely know group comprises linear alkyl sulfonates, often aided by "builders," and alkyl benzene sulfonates. For this invention, a neutral, non-ionic surfactant is preferred. The Hydrophile Lipophile Balance (HLB) value can range from about 2.9 to about 19, and preferably from about 11 to about 12. The surfactant can range from about 0.1% to about 10% of the total weight of the liquid crystal mix. Preferably, the range is from about 1% to about 3%. Most preferably, the range of the surfactant used is from about 1.5% to about 2.3% of the total weight of the liquid crystal mix. Water, such as deionized water, can optionally be added in an amount of up to about 5% (about 0–5%), based on the total weight of the liquid crystal mix.

The effect of the additive surfactant on the cholesteric liquid crystal relaxation times following a voltage pulse is dramatic. The response time can be reduced to below about 150 milliseconds. In certain embodiments of the present invention, the response time was reduced to below about 150 microseconds, and as low as below about 10 microseconds.

An example of this acceleration is shown in FIG. 1 which contrasts the cholesteric LC relaxation time for mixtures with and without added surfactant. In this experiment, a voltage pulse (+54 V) is imposed at a time corresponding to roughly 0.25 seconds on the abscissa time scale. The response of the cholesteric liquid crystal mixes to this voltage pulse is shown in the lower two curves for LCs with (dashed line—See Example 2) and without (solid line—See Example 1) added surfactant. The percent reflection of these displays is shown along the ordinate on the scale reading from 0 to R, with R representing maximum reflection. Initially, at time zero, the LC texture in both displays is of the dark light scattering type and thus exhibit little reflection. Upon application of the voltage pulse (at time 0.25 seconds), both LC mixes are momentarily converted to the nematic phase during application of the pulse but then relax to the reflective cholesteric texture immediately after termination of the pulse. As is clearly shown in FIG. 1, the relaxation from the nematic to the cholesteric reflective structure is much faster for the LC mix with surfactant (FMLCD) compared to the one without surfactant (MLCD). It is particularly important to emphasize that precisely the same LC mix, including the same amount of twist agent, was employed for each system. The two displays differed only in the fact that the fast response display also contained a small amount of an added surfactant. Also shown in FIG. 1 is the subsequent application of a second voltage pulse of lower value (30 volt) which converts both displays back to the dark light scattering state. This is a rapid relaxation process, with or without added surfactant, as shown in FIG. 1. It shows two different response curves at the same trigger voltage. The dotted or dashed curve (C) has the vertical ramp-up section (rise time $\tau_r$ is about 150 microseconds) which is about a thousand time faster than that of the solid curve (C).

Figure 2:
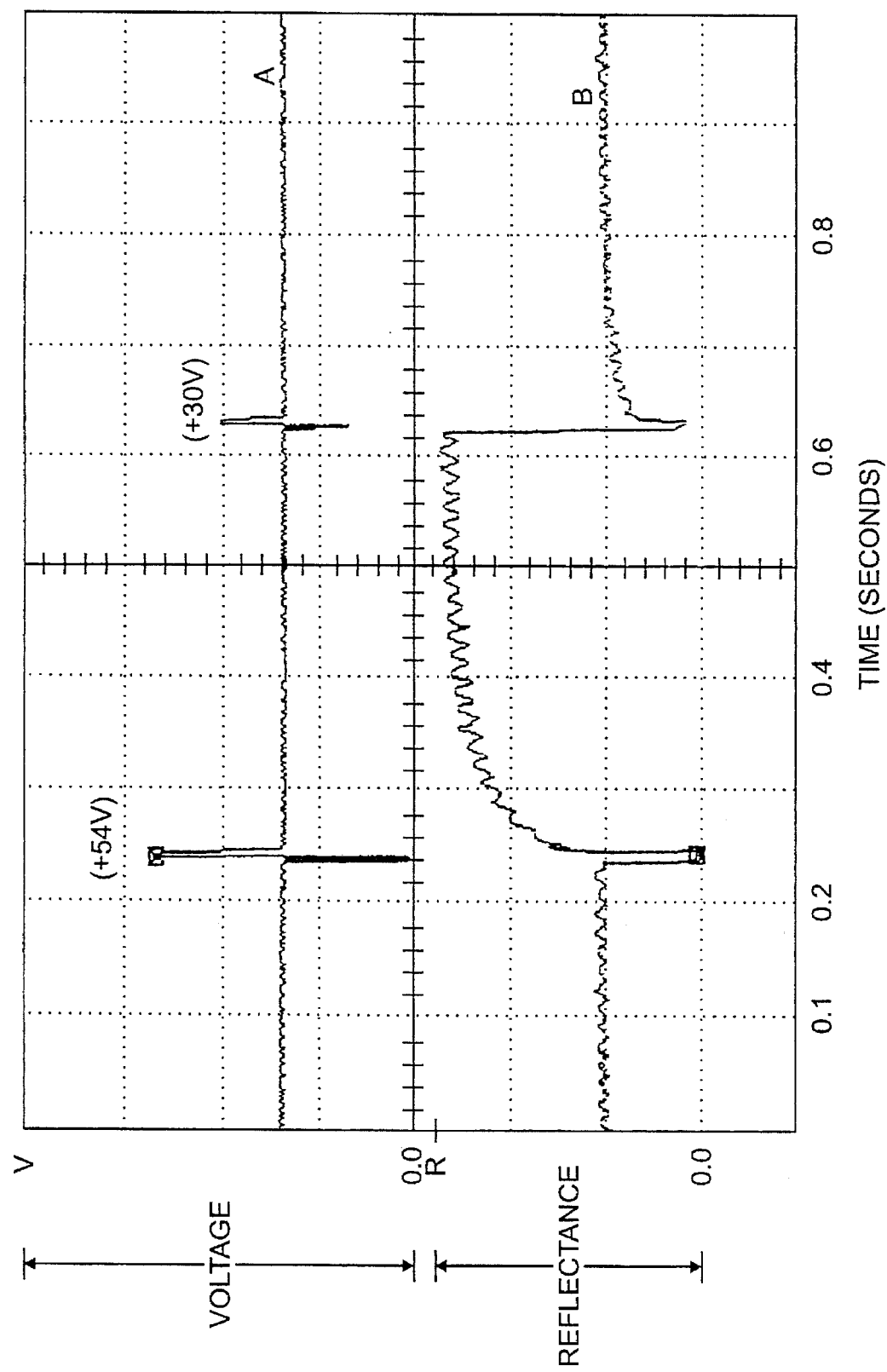
FIG. 2 is a raw data curve showing the exact response time of the cholesteric liquid, without surfactant, [curve B] to the application of voltage pulses [curve A]. Ordinate scales are the same as in FIG. 1.
Figure 3:
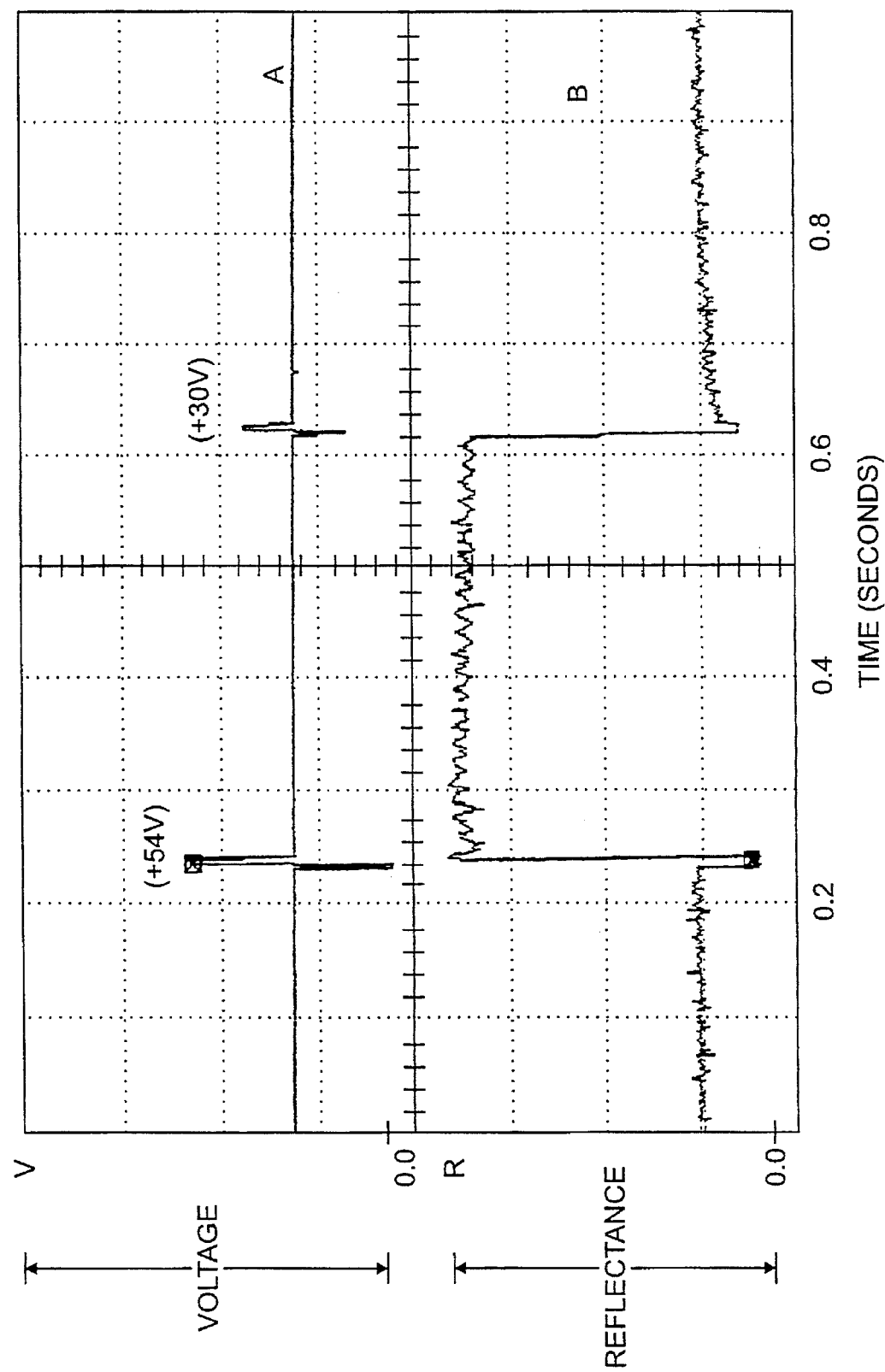
FIG. 3 is a raw data curve illustrating the fast response time of the cholesteric liquid crystals with surfactant additives to the application of a voltage pulse. The ordinate and abscissa scales are identical to those in FIG. 2.
Figure 4:
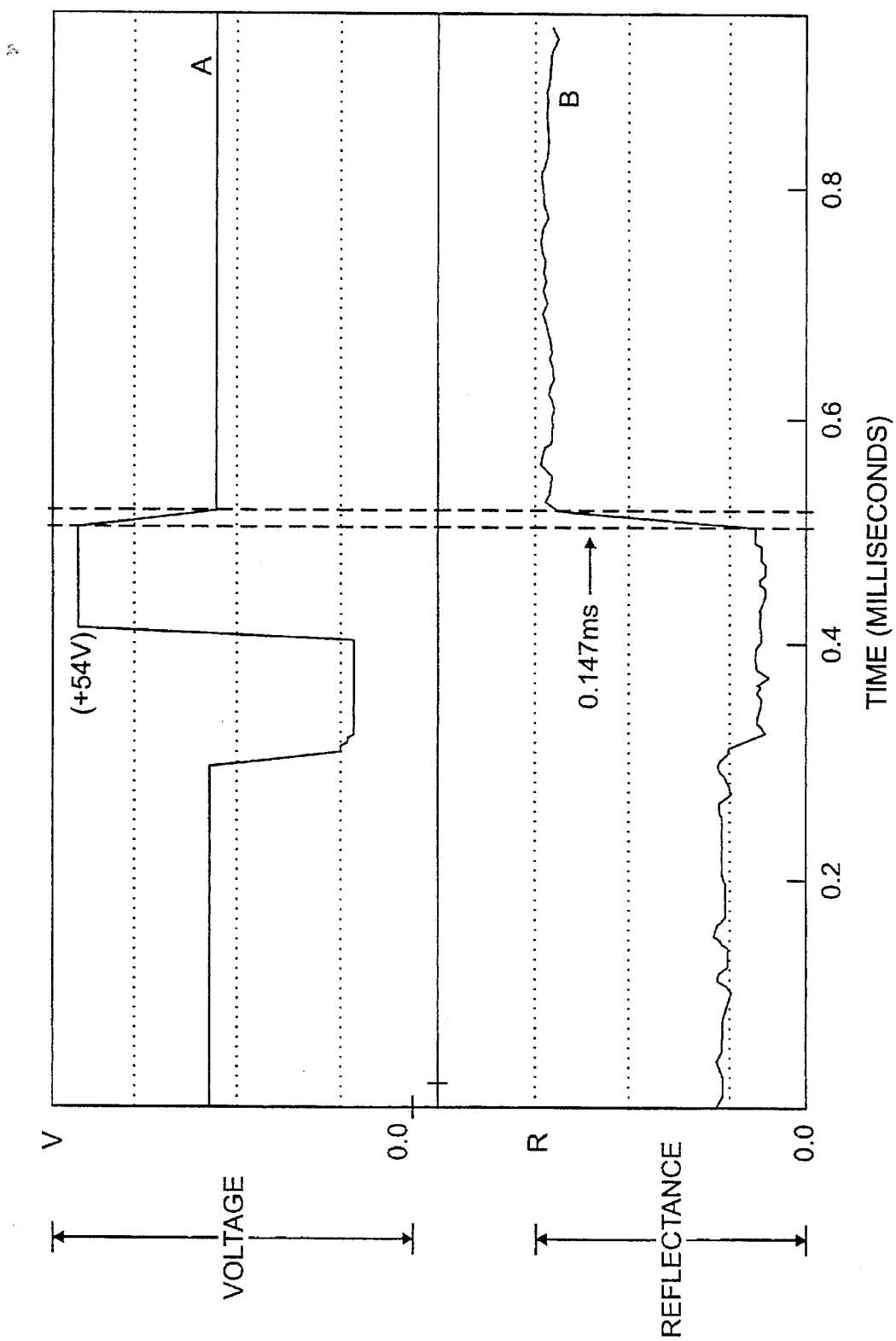
FIG. 4 is a raw data expanded time scale measurements to measure the conversion time from low to high reflectance for cholesteric liquid crystals containing surfactant additives. Time scale (abscissa) has been expanded over that shown in FIGS. 2 and 3. Ordinate scales are the same as those in FIGS. 1 through 3.

The data in FIG. 1 clearly reveal the much faster relaxation time for the LC mix with the surfactant additive. However, a quantitative expression of this acceleration is not readily obtained from FIG. 1 as the phase change for the LC mix with surfactant appears to be instantaneous on the time scale employed. Expansion of the time scale employed permits estimation of the magnitude of the acceleration of the relaxation time for conversion of the cholesteric LC mix from the dark light scattering to reflective structurer. This estimation can be achieved via analysis of the raw data shown in FIGS. 2, 3 and 4. These Figures are similar to that of FIG. 1 in that the upper and lower traces represent the driving voltage and LC response curves respectively. However, the time scales employed are significantly different to that used in FIG. 1. FIG. 2 (See, Example 1) shows the relaxation or transition time for the LC mix for the transition from low to high reflectance without added surfactant (MLCD) following application of the voltage pulse. The upper curve (A) presents the trigger voltage pulse with the scale of 50 Volt. The lower curve (B) shows the response curve with the scale of 50 mv (reflective intensity). Both curves correspond to 0.1 second time scale. The rise time ($\tau_r$) is about 150 milliseconds, as can be read directly from the graph. FIG. 3 (See, Example 2) shows the response time for the LC mix with added surfactant (FMLCD) using the same expanded time scale as in FIG. 2. In the case of adding the surfactance to the cholesteric-nematic liquid crystal, after the trigger voltage pulse, the rise time ($\tau_r$) of 147 microseconds and the decay time ($\tau_d$) of 131 microseconds could be realized. Even on this expanded scale, the response time for the LC mix for the transition from low to high reflectance with surfactant appears to be instantaneous, estimated to be about 10 microseconds or less. Therefore, an even more expanded time scale was employed to estimate the relaxation time for the LC mix with surfactant. This is shown in FIG. 4 (See, Example 2). As these curves indicate, a relaxation time of around 0.147 milliseconds can be estimated from these curves. In fact, this represents an apparent upper limit for this relaxation time as the applied voltage pulse employed was not a pure square wave. The actual relaxation time is expected to be less than about 10 microseconds.

Thus, as the data in FIGS. 2 through 4 reveal, addition of surfactant to the cholesteric LC mix improves (i.e., decreases) the relaxation time for the key light scattering to reflective phase change from approximately 150 ms to less than 0.150 ms. This represents over a one-thousand fold decrease in response time. This phase transition is the key rate determining step in developing faster response cholesteric displays. The reverse transition from reflection to light scattering textures occurs on a much faster time scale. Of particular significance is the fact that the scattering to reflective LC texture transition has been demonstrated using very short helical pitch lengths in which the reflection maximum occurs in the visible region of the electromagnetic spectrum. This permits display operation under conditions in which the contrast ratio is obtained by comparing visible light reflected in the most reflective texture to the back scattering light in the dark state. Since these displays are constructed using small cell gaps (i.e., <5 micron) there is relatively little scattered light and the display appears to be dark black in the light scattering texture. As a result, the current invention provides a cholesteric display which is both ultra fast and exhibits high contrast ratios.

The present invention permits the first development of a direct view cholesteric display which is capable of video rate response. As described below these displays are capable of outstanding gray scale capability and full color even when operated in video applications. Of particular interest is application of this new technology to zero field multistable cholesteric displays (MLCD) of the type described in the introduction. In this particular case, image retention is possible under zero field conditions. Furthermore, since these cholesteric displays eliminate the need for back lighting, this particular embodiment of the present invention represents a complete full-color, excellent gray scale direct view display of exceptionally low power consumption.

The multiplexing involved in development of a direct view, video rate, cholesteric display is outlined below. In the present case, this multiplexing is illustrated employing multistable zero field cholesteric liquid crystals. However, those schooled in the art of liquid crystal displays will recognize that this new technology is applicable to a wide variety of other liquid crystal mixes.

Thus, as described above, it is possible to apply a complete frame image based on this particular illustration involving FMLCDs. It is also clear that with the response times of <150 microseconds, as shown in FIG. 4, that video rate speeds are possible for these direct view displays. Video rate requires at least 30 frames per second or 33.3 ms per frame. This is, of course, well within the demonstrated response time of pixels containing the surfactant additives. In fact, as shown in FIG. 4, the response pixel time is almost certainly much less than 150 microseconds. It must be noted here that MLCD without the surfactant additive exhibited response times of 150 milliseconds which is much greater than 33.3 milliseconds and therefore, is not practicable for video applications.

As those knowledgeable in the art of cholesteric liquid crystal science will recognize, the present invention is perfectly compatible with production of a full color cholesteric liquid crystal display with video rate capability. The full color capability is made possible by adjustment of the helical pitch to optimize reflectivity at a specified wavelength in the visible region of the electromagnetic spectrum as dictated by the equation lambda ($\lambda$)=n P. For example, addition or subtraction of an appropriate amount of twist agent can adjust the helical pitch of the cholesteric LC mix to appear either red (R), green (G) or blue (B). As is well established at this time, full-color image representation involves simply the proper combinations of RGB pixels. The preparation of displays containing the different helical pitch pixels and, thus the required RGB combinations, is obtained by employing special techniques to isolate the RGB cholesteric liquid crystal for each pixel.

The use of this present invention has been discussed above in terms of direct view displays. Such displays capitalize on the inherent advantages of the ultra fast, zero field multistable technology described since unusually low power, low weight flat panel video displays are clearly now possible based on this invention. However, it should also be noted explicitly, that this invention is also perfectly compatible with use in projection type displays. Obviously, the present invention, when applied to projection type displays, will provide the same improved speeds as exhibited in direct view displays.

EXAMPLE 1

A cholesteric liquid crystal mix composed of 0.6043 g of liquid crystals ZLI 5400-100 (Multi-Bottle System for Fast Response STN. Viscosity ($mm^2s^{-1}$) 18 at 20° C. and 375 at −20° C. E. Merck Industries, Inc., Darmstadt, Germany); 0.0450 g of CE2 (A chiral nematic. p—$CH_3CH_2CH(CH_3)$ $CH_2$—$C_6H_4$—$C_6H_4$—COO—$C_6H_4CH_2CH(CH_3)CH_2CH_3$. (BDH Chemicals, Ltd., Poole, England. 5% solution in E8 produces a pitch of 1.9 μm. G. W. Gray and D. G. McDonnell, Mol. Cryst. Liq. Cryst., 37, 189, 1976); 0.0450 g of CB15 (p—NC—$C_6H_4$—$C_6H_4$—$CH_2CH(CH_3)$ $C_2H_5$ (E. Merck Industries, Inc., Darmstadt, Germany); and 0.0450 g of R1011 (A chiral dopant. p—$H_{11}C_5$—$C_6H_{10}$—$C_6H_5$—$COOCH(C_6H_5)$ $CH_2OCO$—$C_6H_5$—$C_6H_{10}$—$C_5H_{11}$ E. Merck Industries, Inc., Darmstadt, Germany) was prepared. This mixture was enclosed between ITO coated glass substrates to form a LC cell. This cell was subjected to voltage pulses as shown in FIG. 1. The response time of this LC mixture was approximately 150 ms as shown in both FIG. 1 and FIG. 2. This LC mix exhibited maximum reflectivity in the green portion of the visible region. This mixture also exhibited multistable zero field stability.

EXAMPLE 2

A cholesteric LC mix identical to that described in Example 1 was prepared. However, to this mixture was added 0.0151 g of the surfactant PEG 400 monostearate (having a HLB value of 11.6) (Chem Service Inc., Westchester, Pennsylvania) and 0.0151 g of 18 M-ohm deionized water. The resultant mixture was again assembled as a liquid crystal cell identical in form to that employed in example 1. This cell was subjected to voltage pulses, as shown in FIG. 1. The response time of this LC mixture containing the added surfactant is shown in FIG. 1 and in FIGS. 3 and 4. The response time for this mixture is less than 150 microseconds, as shown in FIG. 4. This represents over a 1000 fold improvement in response rate relative to the non-surfactant containing mixture of example 1. This mixture retained the multistable zero field stability despite the presence of surfactant in this mixture. It also retained the green color of the reflected light of the mixture of Example 1.

EXAMPLE 3

A cholesteric liquid crystal mix consisting of 0.6551 g of liquid crystals E31LV. (Melting Point −9; Clearing Point 61.5; Temp. dep. of threshold −9.4; Response Factor 834; Birefringence, delta n 0.2269; Viscosity at 0° C. 185. BDH Chemicals, Ltd., Poole, England); 0.0482 g of CE2; 0.0435 g of CB15; 0.0432 g of R1011; 0.0132 g of PEG 1540 monostearate (HLB value 17.3. Chem Service, Inc., Westchester, Pa.) and 0.0110 g of 18 M-ohm $H_2O$ was prepared. When assembled as a liquid crystal cell and subjected to an appropriate 50 V voltage pulse, converted from the scattering (dark) state to the reflective (bright green) state in approximately below 220 microseconds.

EXAMPLE 4

A cholesteric liquid crystal mix consisting of 2.1094 g of liquid crystals 5400-100; 0.187 g of R1011; 0.114 g of CE2;

0.0479 g of CB15; 0.0245 g of PEG 4000 monostearate (HLB value 18.6. Chem Service Inc., Westchester, Pa.). When assembled as a liquid crystal cell and subjected to an appropriate 50 V voltage pulse, converted from the scattering (dark) state to the reflective (bright green) state in approximately below 150 microseconds.

EXAMPLE 5

A cholesteric liquid crystal mix consisting of 2.1094 g of liquid crystals 5400-100; 0.1952 g of R1011; 0.1263 g of CE2; 0.0517 g of CB15; 0.0312 g of sorbitan monoleate (HLB value 15. Chem Service Inc., Westchester, Pa.). When assembled as a liquid crystal cell and subjected to an appropriate 50 V voltage pulse, converted from the scattering (dark) state to the reflective (bright blue) state in approximately below 150 microseconds.

EXAMPLE 6

A cholesteric liquid crystal mix consisting of 0.6852 g of liquid crystals E31LV; 0.0387 g of R1011; 0.0392 g of CE2; 0.0362 g of CB15; 0.0153 g of sorbitan monoleate (HLB value 10. Chem Service Inc., Westchester, Pa.). When assembled as a liquid crystal cell and subjected to an appropriate 50 V voltage pulse, converted from the scattering (dark) state to the reflective (bright red) state in approximately below 150 microseconds.

One method of forming a display in a light modulation device comprises the steps of: providing a cholesteric liquid crystal cell structure having a liquid crystal mix substantially free of polymer additive, having a surface active agent, having a relaxation time of less than about 150 milliseconds, and capable of exhibiting substantially indefinite zero field multistable behavior; and applying a driving voltage across the liquid crystal material to change a domain orientation of the liquid crystal material at a speed, wherein the driving voltage is a function of the width of a voltage pulse. The driving voltage is applied by means of a matrix drive method, wherein: $V_N=(V_R-V_S)/2$; and wherein $V_N$ is the minimum cross-talk voltage, $V_R$ is the voltage pulse required to achieve the maximum zero field stable reflective state, and $V_S$ is the driving voltage employed to establish domain structures intermediate between the planar and focal-conic extremes. $V_N$ can be smaller than $V_T$ where $V_T$ is the threshold voltage.

What is claimed is:

1. A liquid crystal cell structure comprising:
   a first solid substrate having a first inner surface coated with a first conductive layer;
   a second solid substrate having a second inner surface coated with a second conductive layer; and
   a substantially indefinite zero field multistable cholesteric liquid crystal mix located in a space between the first inner surface of the first solid substrate and the second inner surface of the second solid substrate, the liquid crystal mix comprising a surface active agent; a plurality of liquid crystals; and at least one twist agent forming multiple cholesteric domains; wherein each of the multiple cholesteric domains is a visible or near-visible reflective unit; wherein an orientation of each of the multiple cholesteric domains can be changed by application of a voltage pulse; liquid crystal mix is below about 150 milliseconds.

2. The liquid crystal cell structure of claim 1, wherein the first conductive layer is coated with a first amorphous boundary layer.

3. The liquid crystal cell structure of claim 2, wherein the first amorphous boundary layer comprises a polyimide.

4. The liquid crystal cell structure of claim 2, wherein the first amorphous boundary layer comprises a silane.

5. The liquid crystal cell structure of claim 2, wherein helical axes of multiple cholesteric domains are oriented in random directions at the interface with the respective boundary layers.

6. The liquid crystal cell structure of claim 1, wherein the second conductive layer is coated with a second amorphous boundary layer.

7. The liquid crystal cell structure of claim 6, wherein the second amorphous boundary layer comprises a polyimide.

8. The liquid crystal cell structure of claim 6, wherein the second amorphous boundary layer comprises a silane.

9. The liquid crystal cell structure of claim 6, wherein helical axes of multiple cholesteric domains are oriented in random directions at the interface with the respective boundary layers.

10. The liquid crystal cell structure of claim 1, wherein the liquid crystal mix is substantially free of polymer additive.

11. The liquid crystal cell structure of claim 1, wherein the surface active agent is a non-ionic surface active agent in an amount from about 0.1% to about 10% by weight, based on the total weight of the liquid crystal mix.

12. The liquid crystal cell structure of claim 1, wherein the surface active agent is a non-ionic surface active agent in an amount from about 1% to about 3% by weight, based on the total weight of the liquid crystal mix.

13. The liquid crystal cell structure of claim 1, wherein the relaxation time is below about 150 microseconds.

14. The liquid crystal cell structure of claim 1, further comprising up to about 5% by weight of water, based on the total weight of the liquid crystal mix.

15. A liquid crystal cell structure comprising:
    a first solid substrate having a first inner surface coated with a first conductive layer;
    a second solid substrate having a second inner surface coated with a second conductive layer; and
    a substantially indefinite zero field multistable cholesteric liquid crystal mix located in a space between the first inner surface of the first solid substrate and the second inner surface of the second solid substrate, the liquid mix being substantially free of polymer additive, and the liquid crystal mix comprising a non-ionic surface active agent; plurality of liquid crystals; and at least one twist agent forming multiple cholesteric domains; wherein each of the multiple cholesteric domains is a visible or near-visible reflective unit; and wherein relaxation time of the liquid crystal mix is below about 150 milliseconds.

16. The liquid crystal cell structure of claim 15, wherein the first conductive layer is coated with a first amorphous boundary layer.

17. The liquid crystal cell structure of claim 16, wherein the first amorphous boundary layer comprises a polyimide.

18. The liquid crystal cell structure of claim 16, wherein the first amorphous boundary layer comprises a silane.

19. The liquid crystal cell structure of claim 16, wherein helical axes of multiple cholesteric domains are oriented in random directions at the interface with the respective boundary layers.

20. The liquid crystal cell structure of claim 15, wherein the second conductive layer is coated with a second amorphous boundary layer.

21. The liquid crystal cell structure of claim 20, wherein the second amorphous boundary layer comprises a polyimide.

22. The liquid crystal cell structure of claim 20, wherein the second amorphous boundary layer comprises a silane.

23. The liquid crystal cell structure of claim 20, wherein helical axes of multiple cholesteric domains are oriented in random directions at the interface with the respective boundary layers.

24. The liquid crystal cell structure of claim 15, wherein the non-ionic surface active agent is in an amount from about 0.1% to about 10% by weight, based on the total weight of the liquid crystal mix.

25. The liquid crystal cell structure of claim 15, wherein the non-ionic surface active agent is in an amount from about 1% to about 3% by weight, based on the total weight of the liquid crystal mix.

26. The liquid crystal cell structure of claim 15, wherein the relaxation time is below about 150 microseconds.

27. The liquid crystal cell structure of claim 15, further comprising up to about 5% by weight of water, based on the total weight of the liquid crystal mix.

28. A liquid crystal cell structure comprising:
a first solid substrate having a first inner surface coated with a first coating comprising a first conductive layer;
a second solid substrate having a second inner surface coated with a second coating comprising a second conductive layer; and
a substantially indefinite zero field multistable cholesteric liquid crystal mix located in a space between the first inner surface of the first solid substrate and the second inner surface of the second solid substrate, the liquid mix being substantially free of polymer additive, and the liquid crystal mix comprising a non-ionic surface active agent in a range of from about 0.1% to about 10% by weight, based on the total weight of the liquid crystal mix; a plurality of liquid crystals; and at least one twist agent forming multiple cholesteric domains; wherein each of the multiple cholesteric domains is a visible or near-visible reflective unit; wherein an orientation of each of the multiple cholesteric domains can be changed by application of a voltage pulse; wherein the orientation of each of the multiple cholesteric domains is substantially free of interactions among the multiple cholesteric domains and also substantially free of interaction among the multiple cholesteric domains and the first and second solid substrates to yield zero field multistability; and wherein relaxation time of the liquid crystal mix is below about 150 microseconds.

29. The liquid crystal cell structure of claim 28, wherein the non-ionic surface active agent is in an amount from about 1% to about 3% by weight, based on the total weight of the liquid crystal mix.

30. The liquid crystal cell structure of claim 28, further comprising up to about 5% by weight of water, based on the total weight of the liquid crystal mix.

31. A method of forming a display in a light modulation device comprising:
providing a cholesteric liquid crystal cell structure having a liquid crystal mix substantially free of polymer additive, having a surface active agent, reflecting light in a visible or near visible region, having a relaxation time of less than about 150 milliseconds, and capable of exhibiting substantially indefinite zero field multistable behavior; and
applying a driving voltage across the liquid crystal material to change a domain orientation of the liquid crystal material at a speed, wherein the driving voltage is a function of the width of a voltage pulse.

32. The method of claim 31 further comprising:
removing the driving voltage across the liquid crystal material whereby the domain orientation is transformed from one state to a different state.

33. The method of claim 31, wherein the driving voltage is a single voltage pulse.

34. The method of claim 33, wherein the single voltage pulse allows achievement of an unlimited gray scale capability.

35. The method of claim 31, wherein the driving voltage is a succession of pulses.

36. The method of claim 35, wherein the succession of pulses allows an unlimited gray scale capability.

37. The method of claim 31, wherein the driving voltage is applied by means of a matrix drive method wherein:

$$V_N = (V_R - V_S)/2; \text{ and}$$

wherein $V_N$ is the minimum cross-talk voltage, $V_R$ is the voltage pulse required to achieve the maximum zero field stable reflective state, and $V_S$ is the driving voltage employed to establish domain structures intermediate between the planar and focal-conic extremes.

38. The method of claim 37, wherein $V_N$ is smaller than $V_T$, and wherein $V_T$ is the threshold voltage.

39. The method of claim 31, wherein the speed of changing the domain orientation of the liquid crystal material is dependent on both the driving voltage and the width of the voltage pulse.

40. The method of claim 31, wherein the relaxation time is less than about 150 microseconds.

* * * * *

UNITED STATES PATENT AND TRADEMARK OFFICE
CERTIFICATE OF CORRECTION

PATENT NO. : 5,661,533
DATED : August 26, 1997
INVENTOR(S) : Bao-Gang Wu, et al.

It is certified that error appears in the above-indentified patent and that said Letters Patent is hereby corrected as shown below:

Column 5, line 46, "shales" should be --scales--.

Signed and Sealed this

Second Day of December,1997

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,661,533
DATED : August 26, 1997
INVENTOR(S) : Wu et al.

It is certified that error appears in the above-indentified patent and that said Letters Patent is hereby corrected as shown below:

Col. 9, line 61, please insert --and wherein relaxation time of the-- before liquid.

Signed and Sealed this

Twenty-fourth Day of February, 1998

Attest:

BRUCE LEHMAN

Attesting Officer            Commissioner of Patents and Trademarks